United States Patent [19]
Miller et al.

[11] Patent Number: 5,941,960
[45] Date of Patent: Aug. 24, 1999

[54] HOST INITIATED PCI BURST WRITES UTILIZING POSTED WRITE BUFFERS

[75] Inventors: Mark W. Miller, Folsom, Calif.; Ali S. Oztaskin, Beaverton, Oreg.

[73] Assignee: Intel Corporation, Santa Clara, Calif.

[21] Appl. No.: 09/022,302

[22] Filed: Feb. 11, 1998

Related U.S. Application Data

[63] Continuation of application No. 08/755,246, Nov. 22, 1996, which is a continuation of application No. 08/153,317, Nov. 16, 1993, abandoned.

[51] Int. Cl.6 ................................................ G06F 13/00
[52] U.S. Cl. ............................ 710/35; 710/126; 710/128; 710/100
[58] Field of Search ................................. 395/309, 308, 395/306, 310, 821, 823, 280, 855, 856; 710/126, 128, 129, 130, 1, 3, 100, 35, 36

[56] References Cited

U.S. PATENT DOCUMENTS

| | | | |
|---|---|---|---|
| 3,818,461 | 6/1974 | Ward et al. | 710/34 |
| 3,999,168 | 12/1976 | Findley et al. | 395/110 |
| 4,031,519 | 6/1977 | Findley | 395/110 |
| 4,032,899 | 6/1977 | Jenny et al. | 710/131 |
| 4,052,699 | 10/1977 | Micka et al. | 382/297 |
| 4,868,734 | 9/1989 | Idleman et al. | 710/29 |
| 4,965,801 | 10/1990 | DuLac | 364/232.8 |
| 5,075,846 | 12/1991 | Reininger et al. | 364/400 |
| 5,197,144 | 3/1993 | Edenfield et al. | 711/143 |
| 5,239,638 | 8/1993 | Pawlowski et al. | 711/169 |
| 5,241,630 | 8/1993 | Lattin, Jr. et al. | 710/128 |
| 5,269,005 | 12/1993 | Heil et al. | 710/49 |
| 5,289,584 | 2/1994 | Thome et al. | 711/109 |
| 5,325,499 | 6/1994 | Kummer et al. | 711/143 |
| 5,333,276 | 7/1994 | Solari | 712/220 |
| 5,392,407 | 2/1995 | Heil et al. | 710/113 |
| 5,410,656 | 4/1995 | King et al. | 710/126 |
| 5,448,310 | 9/1995 | Kopet et al. | 348/699 |
| 5,483,640 | 1/1996 | Isfeld et al. | 709/213 |
| 5,488,709 | 1/1996 | Chan | 711/118 |
| 5,550,989 | 8/1996 | Santos | 710/126 |
| 5,564,026 | 10/1996 | Amini et al. | 710/128 |
| 5,649,161 | 7/1997 | Andrade et al. | 395/494 |
| 5,664,117 | 9/1997 | Shah et al. | 395/280 |
| 5,717,894 | 2/1998 | Vivio | 395/465 |

FOREIGN PATENT DOCUMENTS

| | | |
|---|---|---|
| 0 416 281 A2 | 3/1991 | European Pat. Off. . |
| 0 627 688 A1 | 12/1994 | European Pat. Off. . |
| 0 629 956 A2 | 12/1994 | European Pat. Off. . |

OTHER PUBLICATIONS

*i486 Microprocessor Hardware Reference Manual—Chapter 3: Processor Bus* Intel Corporation, Santa Clara, CA, 1990, pp. 3-1 to 3-7 and 3-21 to 3-37.

*PCI Local Bus Specification Revision 2.0: Production Version*, Apr. 30, 1993, pp. 23–24 and 28–30.

*Primary Examiner*—Meng-Ai T. An
*Assistant Examiner*—Mackly Monestime
*Attorney, Agent, or Firm*—Blakely, Sokoloff, Taylor & Zafman

[57] ABSTRACT

A bridge logic takes write cycles that appear one at a time as an address followed by an associated data word on a host bus, detects consecutive addresses, and uses this information to create burst cycles on a peripheral control interface (PCI) bus that has protocols that allow burst cycles.

7 Claims, 3 Drawing Sheets

HOST INITIATED PCI BURST WRITES UTILIZING POSTED WRITE BUFFERS

CROSS REFERENCE TO RELATED APPLICATIONS

This is a continuation of application Ser. No. 08/755,246, filed Nov. 22, 1996, pending, which is a continuation of application Ser. No. 08/153,317, filed Nov. 16, 1993, abandoned.

U.S. patent application Ser. No. 886,962, Bridge Buffer Management by Bridge Interception of Synchronization Events, of Young, et al filed May 21, 1992, assigned to Intel Corporation the assignee of the present invention now abandoned.

BACKGROUND OF THE INVENTION

1. Field of the Invention

The present invention is related to data processing systems and more specifically to a method and apparatus for increasing bandwidth on a computer bus that interfaces with a bus that has data bursting capabilities.

2. Prior Art

A prior art peripheral control interface (PCI) bus protocol provides for burst reads and burst writes to attached devices such as a graphics subsystems, local area network and disk drives. However, Central Processor Units (CPU's) such as the Intel i486 can only burst reads from a peripheral bus, not writes to a peripheral bus. If a write were to take place with a prior art system over the PCI interface, such as to a frame buffer memory of a graphics display, then it would be necessary to transfer just one data word (DWORD) at a time. This incurs a high overhead, perhaps 6 clock cycles or more of the PCI bus, even if the target device responds with zero wait states.

It is therefore an object of this invention to provide a method and means for transferring sequential non-burst data on a first bus to burst data on a second bus.

SUMMARY OF THE INVENTION

Briefly, the above object is accomplished in accordance with the invention by providing a logic that takes write cycles that appear one at a time as an address followed by an associated data word on a host bus, detects consecutive addresses, and uses this information to create burst cycles on a PCI bus.

An advantage of this invention is that by using the CPU to PCI posted write buffers in conjunction with the data bursting protocols of the PCI bus, the host write bandwidth is increased by 200 to 300% over the prior art.

A further advantage of this invention is that the bus performance experienced by the host is the same as if the devices, such as local area networks or graphic devices, are actually wired directly to the host bus.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
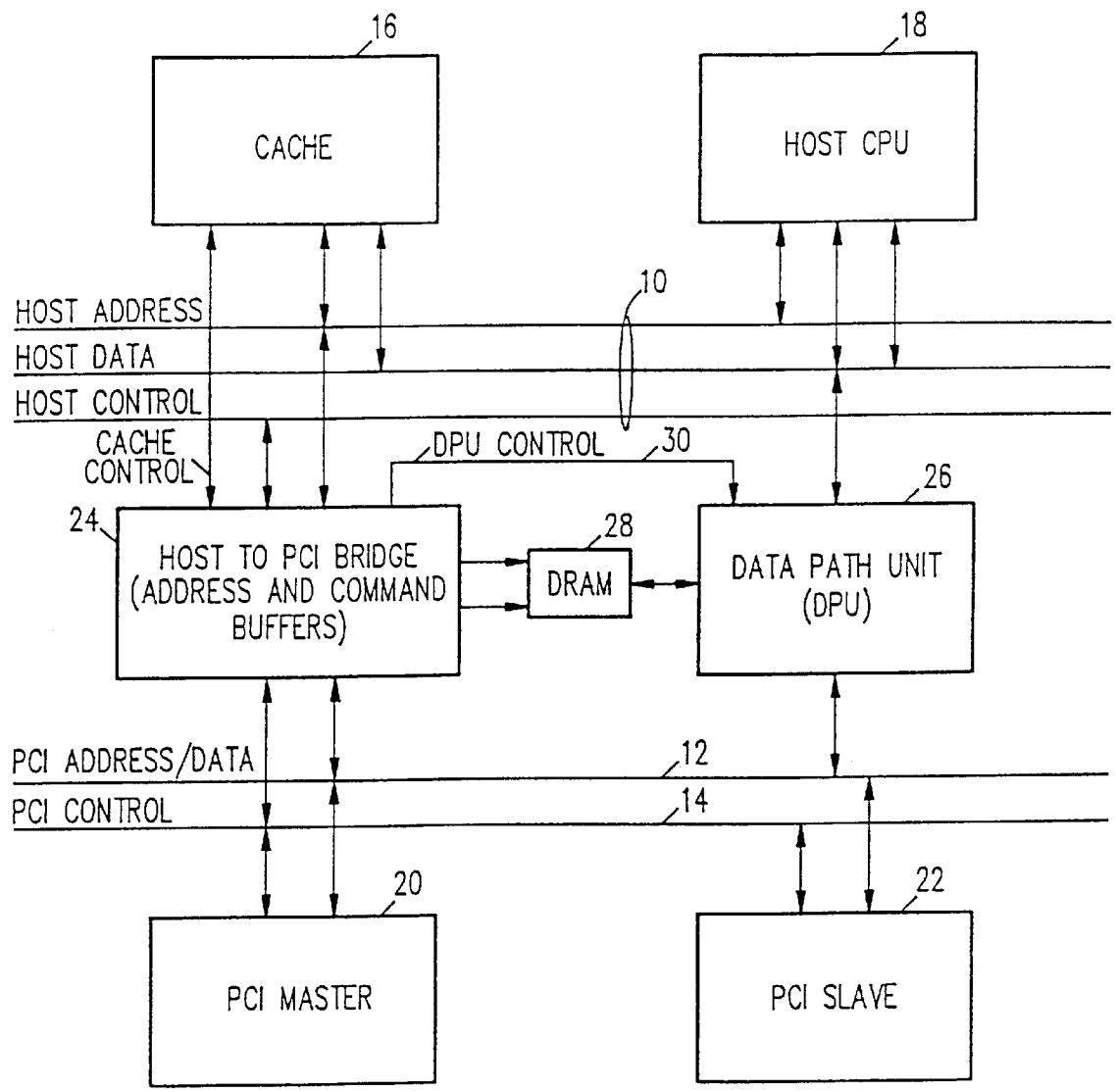
FIG. 1 is a functional block diagram of a data processing system in which the present invention is embodied.

FIG. 1 is a block diagram of a data processing system in which the present invention is embodied. The peripheral control interface (PCI) bus protocol provides for burst reads and burst writes to attached memory devices such as a graphics frame buffer. A first bus (10), the host bus, is comprised of host address, host data and host control (command) lines. A second bus, the PCI bus (12, 14), is comprised of PCI address/data bus (12) and PCI control bus (14). A cache (16) and a Central Processor Unit (CPU-1 8) are attached to the host bus. A PCI Master (20) and a PCI Slave (22) are connected to the PCI bus.

Since CPU's such as the Intel i486 can only burst reads from a bus, not writes to a bus, a Host to PCI Bridge logic (24) and a Data Path Unit (DPU-26) are provided and are connected to the PCI bus. A dynamic random access memory (DRAM-28) is provided. The DPU (26) interfaces to both the Host Bus and to the PCI bus providing dual port access to the DRAM.

In the preferred embodiment of the invention, the Host to PCI Bridge provides the address and control bus connections from host bus (10) to DRAM (28), from host bus (10) to PCI bus (12, 14), from PCI bus (12, 14) to DRAM (28) as well as from PCI bus (12, 14) to host bus (10) for cache snoop purposes. Similarly, the Data Path Unit (26) provides the data bus connections from host bus (10) to PCI bus (12), from host bus (10) to DRAM (28), as well as from PCI bus (12) to DRAM (28). For all practical purposes the Host to PCI Bridge (24) and the Data Path Unit (26) act like a single coherent entity, only implemented as two different components due to some practical limits, for example, limits on pin count. The DPU Control Bus (30) ensures coherent operation of these two blocks.

Writes come from the CPU one at time. If writes are to consecutive addresses, these non-burst CPU cycles are converted by the Host to PCI Bridge and DPU into burst writes on the PCI bus to take advantage of the burst write protocol of the PCI bus. In this manner, each consecutive write takes as little as one clock cycle, depending upon any master or target initiated wait states.

CPU Bus to Bridge Interface

Figure 2:
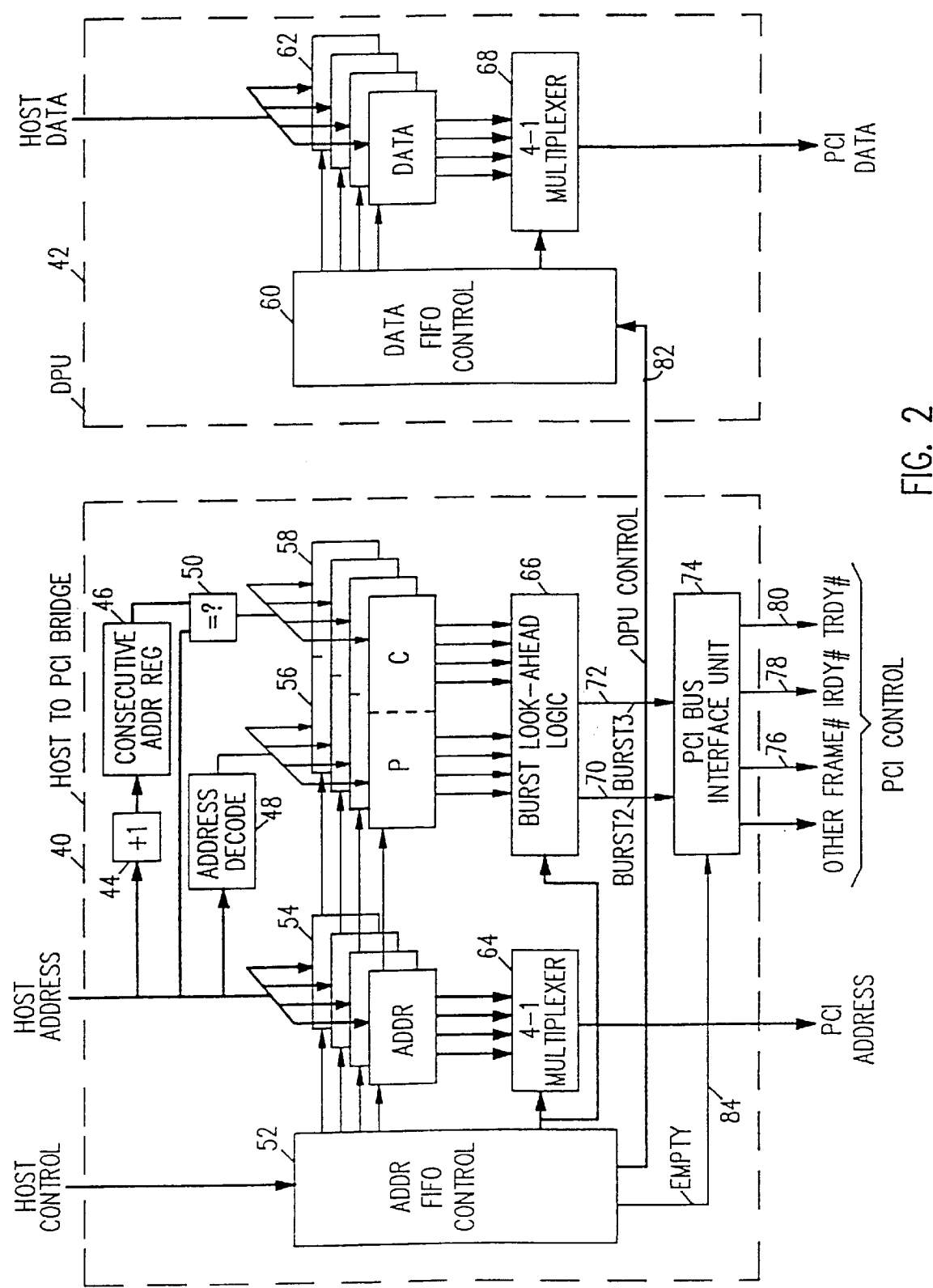
FIG. 2 is a more detailed diagram of the logic within the Host to PCI Bridge and the Data Path Unit shown in FIG. 1; and, FIG. 3 is a timing diagram of the operation of the logic shown in FIG. 1 and FIG. 2.

Refer to FIG. 2. An address first-in first-out (FIFO) buffer (54) in the host to PCI bridge (40) is connected to the host address bus. An address FIFO control logic (52) is connected to the host control bus. The address FIFO control logic (52) controls push and pop operations into one of four posted write buffers. Each posted write buffer stores a 30-bit address (54) and a 32-bit data word (62). Associated with each data/address buffer pair are two flags, a posted flag (P-56) and a consecutive flag (C-58). A data FIFO is located in the Data Path Unit (42) with its own data FIFO control logic (60), however it is linked to the address FIFO control logic (52) through the DPU control bus (82) for coherent operation.

The address FIFO control logic (52) and data FIFO control logic (60) maintain head and tail pointers. The head pointers indicate which one of the four posted write buffer entries is to be popped. Similarly, the tail pointers indicate which one of the four posted write buffer entries is to be used for the push operation.

The host address and data buses are connected to the inputs of the address (54) and data (62) portions of the posted write buffers directly.

Also connected to the host address bus is the address decode logic (48). The address decode logic generates the Postable Flag (P). The postable flag is active if the host address is decoded to a postable region of the PCI memory address space. The host address bus is also connected to an increment logic (44). Every time a host cycle is posted to the posted write buffers, the incremented host address is stored in the consecutive address register (46). An equality comparator (50) is used to compare the host address to the contents of the consecutive address register (46), which holds a previously posted address plus one. The output of the equality comparator (50) is the consecutive flag (C). When a host memory write cycle is posted into one of the four posted write buffers, the P (56) and the C (58) flags are also posted along with address (54) and data (62).

Bridge to PCI Bus Interface

Refer to FIG. 2. The head pointers of the address FIFO control logic (52) and the data FIFO control logic (60) are used as selectors to 4-1 multiplexers (64, 68). The burst look-ahead logic (66) also receives the head pointer (h) and calculates the net posted write buffer pointer (h+1) and the one after that (h+2). The burst look-ahead logic (66) generates the BURST2 (70) by AND'ing posted (P) and consecutive (C) flags posted at the net write buffer (h+1). Similarly, the BURST3 (72) signal is generated by AND'ing posted (P) and consecutive (C) flags posted at the second next write buffer (h+2). The BURST2 (70) and BURST3 (72) equations are:

BURST2<=P($h$+1) AND C($h$+1);

BURST3<=P($h$+2) AND C($h$+2);

where h is the current head pointer.

The PCI bus interface unit (74) monitors the EMPTY (84) signal generated by the address FIFO control logic (52). When the EMPTY (84) signal is sampled inactive, the PCI bus interface unit (74) initiates a PCI bus arbitration sequence.

Bus Timings

Figure 3:
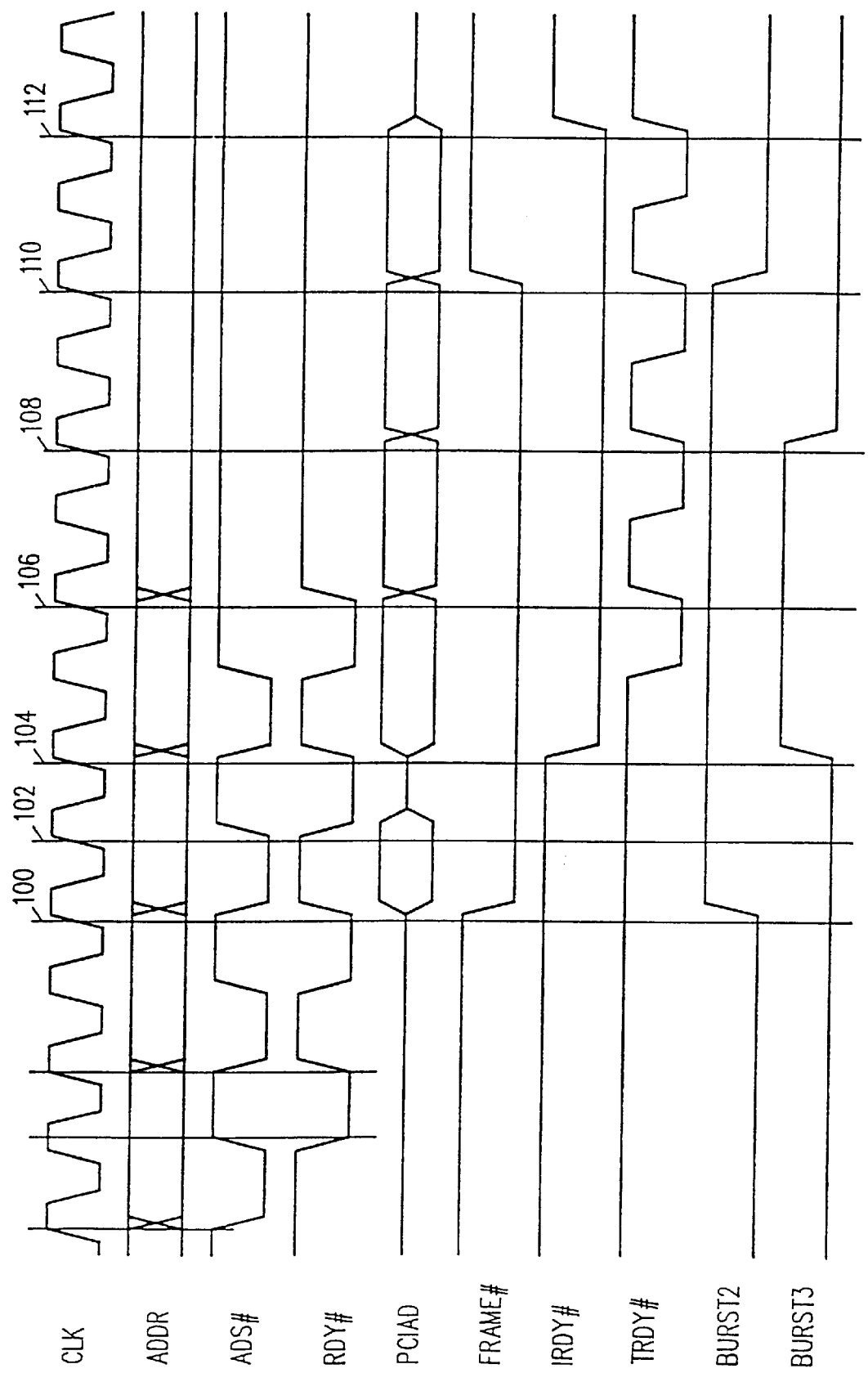

Refer to the timing diagram of FIG. 3. The host microprocessor bus can be any known data bus protocol wherein an address/data pair is placed on the bus followed by another address/data pair. The addresses may or not be consecutive. In FIG. 3, a set of four data words having consecutive addresses are shown. As each DWORD is transferred, the corresponding posted flag is set. The buffers are filled in a round robin manner. If all posted flags are set, the data posting stops until a buffer pair becomes available.

The PCI bus provides for an initiator (I) to initiate burst writes to a target (T) device. In the write case the initiator is the Host to PCI Bridge. The PCI bus protocol uses the three primary control signals: frame (FRAME#-76), Initiator Ready (IRDY#-78) and Target Ready (TRDY#-80).

The FRAME# signal indicates that a transfer is underway. In the first clock of a transfer, FRAME# asserted signals that an address phase is taking place on the bus. When ready to transfer, the Host to PCI Bridge asserts IRDY#. The host-to-PCI bridge enters a data phase when either IRDY# or TRDY# is asserted. Either the initiator or the target can insert wait states. The FRAME# signal must be deasserted if IRDY# is asserted and there is only one more data phase. For a single data phase, as soon as IRDY# is asserted, the FRAME# signal is deasserted. For a burst cycle, the FRAME# signal must remain asserted as multiple data phases take place. The FRAME# signal has to be deasserted at the point in time where there is only one more data phase.

Once the access to the PCI bus is granted, the PCI address output buffers are turned on and the FRAME# is asserted indicating start of a PCI cycle (100). On the next clock edge (102), the PCI address buffers of the host to PCI bridge are turned off allowing bus turn-around time for PCI's multiplexed address/data bus. On the following clock edge (104), the Data Path Unit PCI data output buffers are enabled, and the IRDY# signal is asserted indicating valid data on PCI address/data bus. Also at this clock edge an important decision is made. If there is one more consecutive data (excluding the one driven on the bus) in the posted write buffers then the FRAME# signal is kept asserted, otherwise the FRAME# signal has to be deasserted. This is where the BURST2 signal is used. In FIG. 3 the BURST2 signal is active at this clock edge indicating availability of at least one more consecutive data in the posted write buffers, hence the FRAME# signal is kept asserted.

Once the target device indicates acceptance of data, it asserts the TRDY# signal. When the host the PCI bridge samples both IRDY# and TRDY# signals active it has to make yet another decision. If there are two more consecutive data (excluding the one already driven to the bus) in the posted write buffers then the FRAME# signal is kept asserted, Otherwise, there is only one more data to transfer, hence the FRAME# signal must be deasserted. This is where the BURST3 signal is used. In FIG. 3 the BURST3 signal is active at clock edges 106 and 108. The FRAME# signal is kept asserted on these clock edges to continue with PCI burst write cycle. However on clock edge 110 the BURST3 signal is inactive, hence the FRAME# signal is deasserted on this clock edge, and transfer of the last consecutive data completed at clock edge 112. At this clock edge the IRDY# is also deasserted indicating completion of the PCI cycle. The posted write buffer entries are popped (discarded) as the PCI data transfers took place (on clock edges 106, 108, 110 and 112).

While the invention has been particularly shown and described with reference to preferred embodiments thereof, it will be understood by those skilled in the art that the foregoing and other changes in form and detail may be made therein without departing from the scope of the invention.

What is claimed is:

1. In a data processing system including
   a first host bus for sequentially providing a first address and a first data corresponding to said first address and a second address and a second data corresponding to said second address;
   a second bus;
   a plurality of data registers;
   a plurality of consecutive flags, there being a first consecutive flag associated with said first data register and a second consecutive flag associated with said second data register; and,
   a plurality of address registers;
   a method comprising:
   A. selecting a first data register of said plurality of data registers;
   B. selecting a first address register of said plurality of address registers;
   C. transferring said first data on said first bus to said first data register;
   D. transferring said first address on said first bus to said first address register;
   E. adding one to said first address to provide a calculated address;
   F. selecting a second data register of said plurality of data registers;
   G. selecting a second address data register of said plurality of address registers;

H. transferring said second data on said first bus to said second data register;

I. transferring said second address on said first bus to said second address register;

J. comparing said second address with said calculated address;

K. generating a set C flag signal upon a condition that said address and said calculated address are equal;

L. using said set C flag signal to set said second consecutive flag to a first state;

M. asserting a frame signal on said second bus to indicate that a data transfer is taking place on second said bus;

N. generating a burst 2 signal upon a condition that said C flag is in said first state; and O. deasserting said frame signal upon a condition that said burst signal is asserted.

2. A data processing system comprising:

a first host bus for sequentially providing a first address and a first data corresponding to said first address and a second address and a second data corresponding to said second address;

a second bus;

a plurality of data registers;

a plurality of consecutive flags, there being first consecutive flag associated with said first data register and a second consecutive flag associated with said second data register;

a plurality of address registers;

input selection means;

said input selection means including first means for selecting a first data register of said plurality of data registers;

said input selection means including second means for selecting a first address register of said plurality of address registers;

third means connected to said first means for transferring said first data on said first bus to said first data register;

fourth means connected to said second means for transferring said first address on said first bus to said first address register;

fifth means connected to said first address register for adding one to said first address to provide a calculated address;

said input selection means including sixth means for selecting a second data register of said plurality of data register;

said input selection means including seventh means for selecting a second address register of said plurality of address registers;

eighth means connected to said sixth means for transferring said second data on said first bus to said second data register;

ninth means connected to said seventh means for transferring said second address on said first bus to said second address register;

tenth means connected to said second address register and to said fifth means for comparing said second address with said calculated address; and, eleventh means connected to said tenth means for generating a set C flag signal upon a condition that said address and said calculated address are equal.

3. The apparatus in accordance with claim 2 further comprising:

twelfth means connected to said eleventh means responsive to said set C flag signal for setting said second consecutive flag to a first state.

4. The apparatus in accordance with claim 3 further comprising:

output selection means connected to said plurality of data registers and to said second bus;

said second bus including burst invoking protocols;

said output selection means including burst lookahead means connected to said plurality of consecutive flags for controlling said burst invoking protocols in accordance with said second consecutive flag being in said first state.

5. A data processing system comprising:

a first host bus for sequentially providing a first address and a first data corresponding to said first address and a second address and a second data corresponding to said second address;

a second bus;

a plurality of data registers;

a plurality of consecutive flags, there being first consecutive flag associated with said first data register and a second consecutive flag associated with said second data register;

a plurality of address registers;

an input select logic for selecting a first data register of said plurality of data registers and a first address register of said plurality of address registers and at a subsequent time selecting a second data register of said plurality of data registers and a second address register of said plurality of address registers;

a first gate circuit connected to said input select logic for transferring said first data on said first bus to said first data register and for transferring said first address on said first bus to said first address register;

a second gate circuit connected to said input select logic for transferring said second data on said first bus to said second data register at said subsequent time and for transferring said second address on said first bus to said second address register at said subsequent time;

an adder connected to said first address register for adding one to said first address to provide a calculated address;

an exclusive OR connected to said second address register and to said adder for comparing said second address with said calculated address; and an output of said exclusive OR being a set C flag signal which is asserted upon a condition that said address and said calculated address are equal.

6. The apparatus in accordance with claim 5 further comprising:

a signal line connecting said output of said exclusive OR to said second consecutive flag.

7. The apparatus in accordance with claim 6 further comprising:

an output select logic connected to said plurality of data registers and to said second bus;

said second bus including burst invoking protocols;

said output select logic including burst lookahead means connected to said plurality of consecutive flags for controlling said burst invoking protocols in accordance with said second consecutive flag being in said first state.

* * * * *

UNITED STATES PATENT AND TRADEMARK OFFICE
CERTIFICATE OF CORRECTION

PATENT NO. : 5,941,960
DATED : August 24, 1999
INVENTOR(S) : Miller, et al.

It is certified that error appears in the above-identified patent and that said Letters Patent is hereby corrected as shown below:

In column 2 at line 14 delete "1 8" and insert -- 18 --

Signed and Sealed this

Fourth Day of April, 2000

Q. TODD DICKINSON

*Attest:*

*Attesting Officer*  *Director of Patents and Trademarks*